(12) United States Patent
Kametani

(10) Patent No.: US 11,663,430 B2
(45) Date of Patent: May 30, 2023

(54) IMAGE FORMATION APPARATUS AND METHOD OF IMAGE FORMATION

(71) Applicant: SHARP KABUSHIKI KAISHA, Sakai (JP)

(72) Inventor: Yohsuke Kametani, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/538,481

(22) Filed: Nov. 30, 2021

(65) Prior Publication Data

US 2022/0180134 A1 Jun. 9, 2022

(30) Foreign Application Priority Data

Dec. 7, 2020 (JP) .............................. JP2020-202764

(51) Int. Cl.
*G06K 15/02* (2006.01)
*G06F 3/12* (2006.01)
*G06K 15/00* (2006.01)

(52) U.S. Cl.
CPC ......... *G06K 15/021* (2013.01); *G06F 3/1204* (2013.01); *G06F 3/1208* (2013.01); *G06F 3/1256* (2013.01); *G06K 15/1836* (2013.01); *G06K 15/4065* (2013.01)

(58) Field of Classification Search
None
See application file for complete search history.

(56) References Cited

U.S. PATENT DOCUMENTS

| | | | |
|---|---|---|---|
| 2002/0051182 A1* | 5/2002 | Sommer | H04N 1/2307 358/1.15 |
| 2015/0036172 A1* | 2/2015 | Tachibana | B65H 7/20 358/1.14 |
| 2015/0254535 A1* | 9/2015 | Suzuki | G06F 3/1243 358/1.6 |
| 2017/0094109 A1* | 3/2017 | Inui | G06K 15/1868 |

(Continued)

FOREIGN PATENT DOCUMENTS

| | | | | |
|---|---|---|---|---|
| JP | 2011128426 | * | 6/2011 | H04N 1/00 |
| JP | 2016172435 | * | 9/2016 | H04N 1/00 |

(Continued)

*Primary Examiner* — Beniyam Menberu
(74) *Attorney, Agent, or Firm* — ScienBiziP, P.C.

(57) ABSTRACT

An image formation apparatus includes a communication unit, a controller, an operation unit, and an image forming device. The communication unit is configured to receive, as a printing job, a printing setting and printing data. The printing setting includes a size corresponding to one of a longitudinal-feed envelope and a lateral-feed envelope, but does not designate which of the longitudinal-feed and lateral-feed envelopes undergoes printing. The raster image generator is configured to generate a raster image corresponding to the longitudinal-feed envelope and a raster image corresponding to the lateral-feed envelope in accordance with the printing data. The operation unit is configured to display a screen that receives a selection between the longitudinal-feed and lateral-feed envelopes to receive the selection made by a user. The image forming device is configured to perform printing with the raster image corresponding to the longitudinal-feed or lateral-feed envelope selected.

5 Claims, 9 Drawing Sheets

(56) References Cited

U.S. PATENT DOCUMENTS

| | | | | |
|---|---|---|---|---|
| 2017/0094110 A1* | 3/2017 | Hiraike | .............. | H04N 1/00721 |
| 2017/0223225 A1* | 8/2017 | Kaneda | ................ | H04N 1/0044 |
| 2020/0314254 A1* | 10/2020 | Iwasaki | ................ | G06F 3/1208 |
| 2021/0089250 A1* | 3/2021 | Jo | ........................ | G06F 3/1285 |

FOREIGN PATENT DOCUMENTS

| | | | | |
|---|---|---|---|---|
| JP | 2018-020497 A | | 2/2018 | |
| JP | 2020082523 | * | 6/2020 | .............. B41J 29/38 |

* cited by examiner

IMAGE FORMATION APPARATUS AND METHOD OF IMAGE FORMATION

CROSS-REFERENCE TO RELATED APPLICATION

The present application claims priority from Japanese Patent Application Number 2020-202764, the content of which is hereby incorporated by reference into this application.

BACKGROUND OF THE INVENTION

Field of the Invention

This invention relates to an image formation apparatus and method of image formation capable of printing to envelopes.

Description of the Related Art

A known image formation apparatus that allows a user to place envelopes, printing sheets, into the manual-feed tray or the feed tray so that destination addresses, senders and other things are printed to the envelopes.

Although envelopes have various sizes, every envelope has a rectangular shape with three of its four sides folded into a bag and with an openable and closable flap (lid) on the remaining side, unlike ordinary printing sheets. For stable paper feed and transfer, the user is notified of placing envelopes into the manual-feed tray or the feed tray with their open flaps located at the rear ends.

The following technique is known that relates to printing to envelopes (Japanese Patent Application Laid-Open No. 2018-020497). For longitudinal envelope placement as a standard setting in order to keep envelopes from becoming wrinkled, the technique includes controlling an operation display to display a button for setting among all available envelope types, and to display a placement-direction guide image that is to be a standard setting. The technique also includes switching the placement-direction guide image in accordance with the type of envelopes that has been set. The technique also includes setting an operation sequence in conformance with the type of envelopes and the designated placement direction.

SUMMARY OF THE INVENTION

If the user feeds envelopes with their flaps placed on either right or left, the right-and-left balance of paper feed and transfer loses, easily causing wrinkles and paper jams. The direction of paper feed is thus determined by the type of envelopes, to be specific, by the position of envelope sides provided with a flap; unlike ordinary printing sheets, such as A4 printing sheets, envelopes are not ones that can be placed both longitudinally and horizontally.

Although having an equal longer-side length and an equal shorter-side length, some envelopes have their flaps on the longer sides, and others have their flaps on the shorter sides. These two types of envelopes are clearly distinguished from each other even though they have an equal shorter-side length and an equal longer-side length.

Examples of an envelope into which an A4 sheet folded in thirds is put include two types: a Nagagata san-gou in Japanese, meaning a lengthwise elongated envelope 3; and a Yougatanaga san-gou in Japanese (or also called Yougata zero-gou), meaning a Western lengthwise elongated envelope 3. Although both types have a shorter-side size of 120 mm and a longer-side size of 235 mm, they are distinguished from each other; an envelope with a flap on its shorter side is called a Nagagata san-gou, and an envelope with a flap on its longer side is called a Yougatanaga san-gou.

Another example is an envelope having 90 nm long shorter sides and 205 nm long longer sides. There are two different types of this envelope: an envelope with a flap on its shorter side is called a Nagagata yon-gou; and an envelope with a flap on its longer side is called a Yougatanaga yon-gou.

Another example include a Nagagata jyuusan-gou, a Yougata yon-gou (both having 105 mm long shorter sides and 235 mm long longer sides), a Nagagata jyuuyon-gou, and a Yougata go-gou (both having 95 mm long shorter sides and 217 mm long longer sides).

When a user executes a printing job with explicit designation of an envelope type (e.g., a Nagagata san-gou or a Yougatanaga san-gou), the direction of paper feed can be estimated from the designated envelope type. Printing data undergoes processing by a raster image processor (RIP) in accordance with the feed direction, thus generating a raster image (RIP image) in conformance with an image that should be printed. In some cases however, an envelope type for use in printing is not designated explicitly even though the lengthwise and widthwise size of an image is identified. For instance, whereas the size of a document image is set in an application relating to document processing, setting on a printing sheet is not performed in a driver that is provided by a printer driver, and printing is executed at the setting of feed tray auto-selection. When the feed tray is supplied with either one of an envelope that is to be fed longitudinally and an envelope that is to be fed laterally, the supplied envelope needs to be used for printing. However, the image formation apparatus cannot determine on which envelope type should undergo printing, if the feed tray is supplied with neither an envelope that is to be fed longitudinally nor an envelope that is to be fed laterally, or if the feed tray is supplied with both types of envelops.

In response to a printing job without the designation of an envelope type for use in printing, the image formation apparatus can generate a RIP image by, for instance, estimating an envelope type that is used most frequently (e.g., a Nagagata san-gou). When the user places the estimated type of envelope into the manual-feed tray or feed tray, printing is performed without problems. If the user places an unexpected type of envelope (e.g., a Yougatanaga san-gou) unfortunately, the supplied envelope does not coincide with a region of the RIP image, thus offering a print with a partially missing, misoriented image thereon. This renders the printed envelope useless. Envelopes, which are more expensive than ordinary printing sheets, are preferably avoided from needless printing.

To solve this problem, it is an object of one aspect of this invention to provide an image formation apparatus that offers proper printing in response to a printing job without the designation of an envelope type for use in printing. It is also an object of this invention to provide a method of image formation that offers such proper printing.

One aspect of this invention provides an image formation apparatus that includes a communication unit, a controller, a raster image generator, an operation unit, and an image forming device. The communication unit receives, as a printing job, a printing setting and printing data corresponding to the printing setting. The printing setting includes a size corresponding to one of a longitudinal-feed envelope and a lateral-feed envelope, but does not designate which of the longitudinal-feed and lateral-feed envelopes undergoes printing. The longitudinal-feed envelope and the lateral-feed envelope have an equal shorter-side length and an equal longer-side length, and have respective flaps attached in mutually different directions. The controller controls the execution of the printing job received. Upon being instructed by the controller, the raster image generator generates a raster image corresponding to the longitudinal-feed envelope and a raster image corresponding to the lateral-feed envelope in accordance with the printing data. Upon being instructed by the controller, the operation unit displays a screen that receives a selection between the longitudinal-feed and lateral-feed envelopes, to receive the selection made by a user. Upon being instructed by the controller, the image forming device performs printing with the raster image corresponding to the longitudinal-feed or lateral-feed envelope selected.

Another aspect of this invention also provides, from another point of view, a method of image formation that is performed by a controller of an image formation apparatus. The method includes receiving, as a printing job, a printing setting and printing data corresponding to the printing setting. The printing setting includes a size corresponding to one of a longitudinal-feed envelope and a lateral-feed envelope, but does not designate which of the longitudinal-feed and lateral-feed envelopes undergoes printing. The longitudinal-feed envelope and the lateral-feed envelope have an equal shorter-side length and an equal longer-side length, and have respective flaps attached in mutually different directions. The method also includes generating a raster image corresponding to the longitudinal-feed envelope and a raster image corresponding to the lateral-feed envelope in accordance with the printing data. The generation step is performed by a raster image generator. The method also includes displaying a screen that receives a selection between the longitudinal-feed and lateral-feed envelopes, to receive the selection made by a user. The display step is performed by an operation unit. The method also includes printing by using the raster image corresponding to the longitudinal-feed or lateral-feed envelope selected. The printing step is performed by an image forming device.

The image formation apparatus according to the aspect of this invention includes the raster image generator, which, upon being instructed by the controller, generates a raster image corresponding to the longitudinal-feed envelope and a raster image corresponding to the lateral-feed envelope in accordance with the printing data. The raster image generator does so upon receiving, as a printing job, a printing setting and printing data corresponding to the printing setting. The printing setting conditions a size corresponding to one of the longitudinal-feed and lateral-feed envelopes, but does not condition which of the longitudinal-feed and lateral-feed envelopes undergoes printing. The longitudinal-feed and lateral-feed envelopes have an equal shorter-side length and an equal longer-side length, and have respective flaps attached in mutually different directions. The image formation apparatus also includes the operation unit, which, upon being instructed by the controller, displays a screen that receives a selection between the longitudinal-feed and lateral-feed envelopes, to receive the selection made by the user. The image formation apparatus also includes the image forming device, which, upon being instructed by the controller, performs printing with the raster image corresponding to the longitudinal-feed or lateral-feed envelope selected. The image formation apparatus thus offers proper printing in response to a printing job without the designation of an envelope type for use in printing.

That is, the controller generates two raster images corresponding to the respective longitudinal-feed and lateral-feed envelopes, while receiving a user selection between the longitudinal-feed and lateral-feed envelopes. The controller thus offers printing with a raster image that conforms to either of the envelopes selected. In addition, the foregoing configuration can complete printing more rapidly than generating a raster image after envelope selection.

The method of image formation according to the other aspect of this invention achieves a similar effect.

DETAILED DESCRIPTION OF THE INVENTION

Aspects of the invention will be detailed with reference to the drawings. The following description is illustrative in all aspects and is thus not restrictive.

Example Configuration of Image Formation Apparatus

Figure 1:
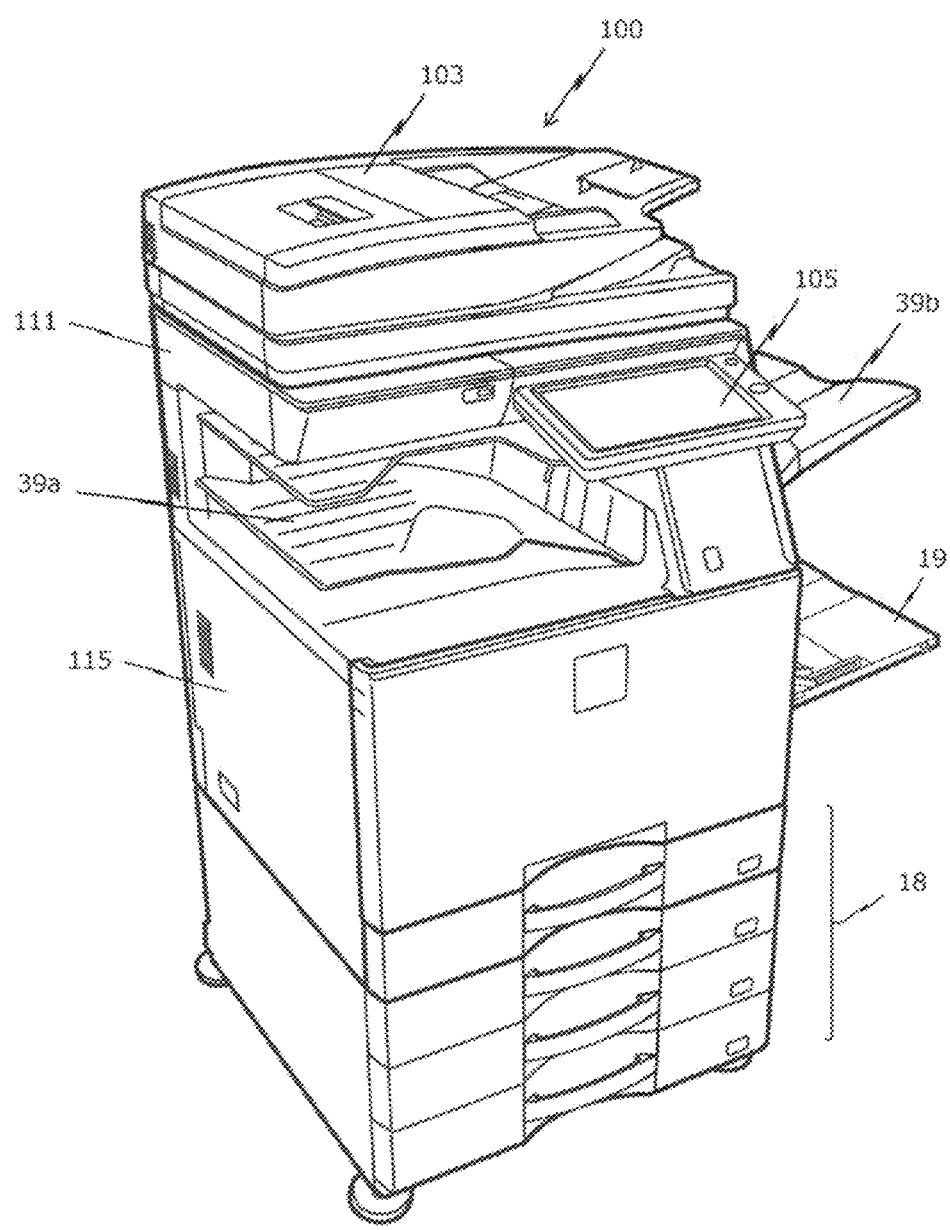
FIG. 1 is a perspective view of the appearance of a multifunction printer, which is a preferred embodiment of an image formation apparatus of this invention.
Figure 2:
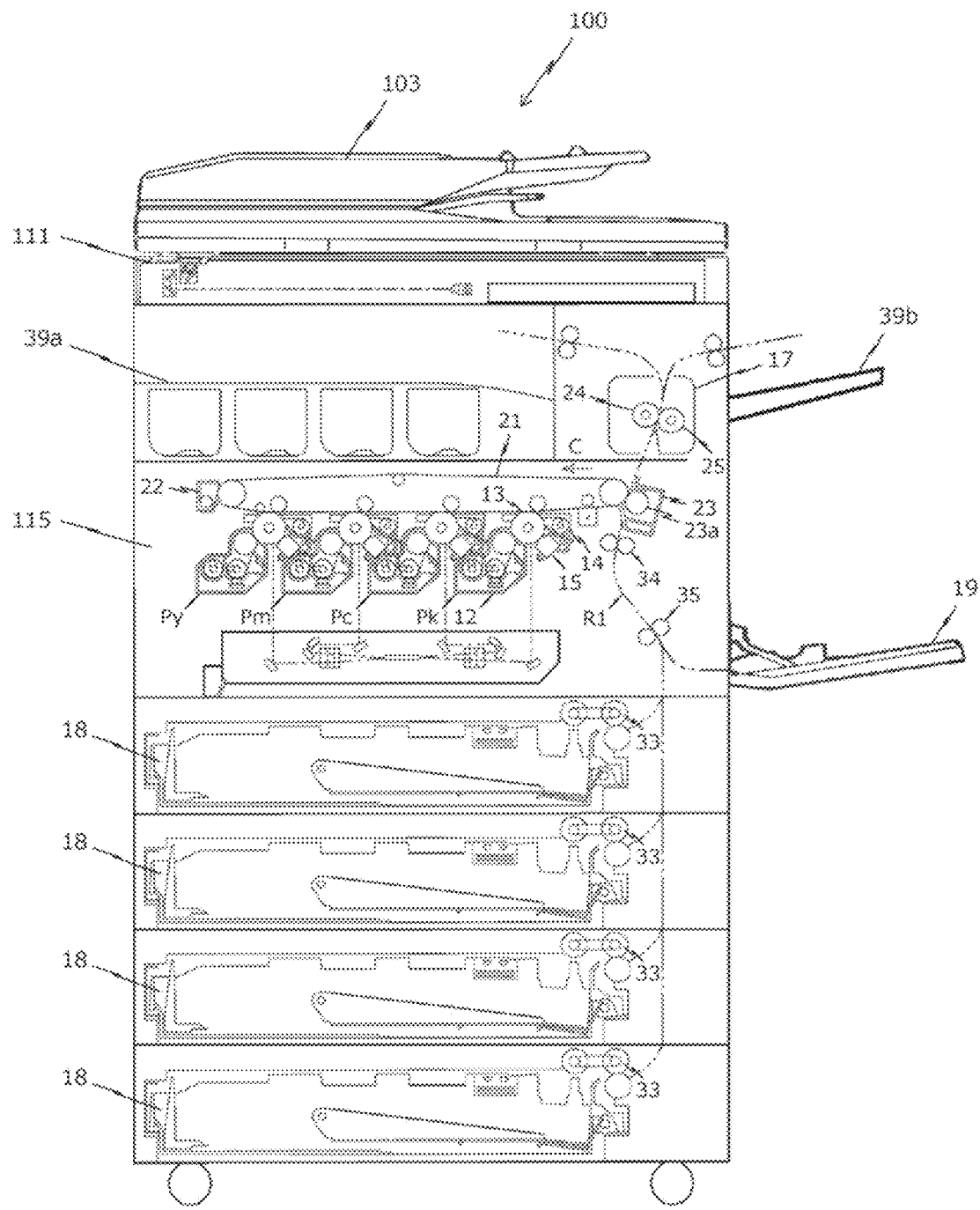
FIG. 2 is a sectional view of the mechanistic configuration of the body of the multifunction printer 100 shown in FIG. 1.

FIG. 1 is a perspective view of the appearance of a multifunction printer, which is a preferred embodiment of an image formation apparatus of this invention. FIG. 2 is a sectional view of the mechanistic configuration of the body of the multifunction printer, 100, shown in FIG. 1.

As illustrated in FIG. 1, the multifunction printer 100 includes the following: an operation unit 105; an image reading device 111 that reads a document; a document transferring unit 103 that transfers the document to a read unit; and an image forming device 115 that forms an image. The multifunction printer 100 also includes a feed tray drawer 18, a manual-feed tray 19, and output trays 39*a* and 39*b*.

The following briefly describes the internal configuration of the multifunction printer 100 shown in FIG. 2.

The multifunction printer 100 prints a color image using black (K), cyan (C), magenta (M) and yellow (Y) onto a printing sheet. Alternatively, the multifunction printer 100 prints a single-colored (e.g., black) monochrome image onto a printing sheet. The multifunction printer 100 is thus provided with, but not limited to, four development units 12, four photoconductive drums 13, four drum cleaners 14, and four electrifiers 15. To form four kinds of toner images corresponding to the respective colors, these individual components are associated with respective black, cyan, magenta, and yellow, thus constituting four image stations Pk, Pc, Pm, and Py.

A toner image is formed at any of the image stations Pk, Pc, Pm, and Py in the following manner. The drum cleaner 14 removes and collects toner residues on the surface of the photoconductive drum 13. The electrifier 15 then electrifies the surface of the photoconductive drum 13 uniformly at a predetermined potential. An optical-beam scanning unit 11 then scans the uniformly electrified surface and exposes the surface to light to form an electrostatic latent image onto the surface. The development unit 12 then develops the electrostatic latent image. This forms a toner image of each color onto the surface of the corresponding photoconductive drum 13. The development unit 12 contains a developer consisting of toner and carriers.

A mid-transfer belt 21 rolls in an arrow direction C. A belt cleaning unit 22 removes and collects toner residues on the rolling mid-transfer belt 21. The toner image of each color formed on the surface of the corresponding photoconductive drum 13 is transferred and superimposed onto the mid-transfer belt 21 sequentially to form a color toner image onto the mid-transfer belt 21.

The feed tray drawer 18, a kind of feed tray, accommodates paper sheets and feeds the paper sheets into a secondary transfer unit 23. The feed tray drawer 18 accommodates four kinds of paper sheets individually, as illustrated in FIG. 2.

The manual-feed tray 19, another kind of feed tray, feeds paper sheets placed at a predetermined location into the secondary transfer unit 23. The manual-feed tray 19 in the preferred embodiment includes a size detecting mechanism, and a sheet sensor that detects the presence or absence of a paper sheet at the predetermined location.

Printing sheets are drawn from any one of the four feed tray drawer 18 by a pick-up roller 33 and are fed into the secondary transfer unit 23 via a sheet transfer path R1. Alternatively, printing sheets are fed from the manual-feed tray 19 by a pick-up roller not shown and are fed into the secondary transfer unit 23 via the sheet transfer path R1. Disposed on the sheet transfer path R1 is a resist roller 34 that stops printing sheets once to align the perimeters of the printing sheets. Also disposed thereon is, but not limited to, a transfer roller 35 that promotes the transfer of the printing sheets. After stopping the printing sheets once, the resist roller 34 transfers the printing sheets to a NIP region, which is interposed between the mid-transfer belt 21 and a secondary transfer roller 23*a*, in accordance with the timing of toner image transfer.

A color toner image formed on the surface of the mid-transfer belt 21 is transferred to a printing sheet at the time when the printing sheet passes through the NIP region. After passing through the NIP region, the printing sheet is sandwiched between a heating roller 24 and a pressurization roller 25, both included in a fuser unit 17, to undergo heating and pressurization. This heating and pressurization fuses the color toner image onto the printing sheet.

The printing sheet passed through the fuser unit 17 is ejected to the output tray 39*a* or 39*b*. Where to eject the printing sheet is controlled by a controller 110, which will be described later on, and a transfer path is switched in such a manner that a switching mechanism not shown guides the printing sheet to either the output tray 39*a* or 39*b*.

Figure 3:
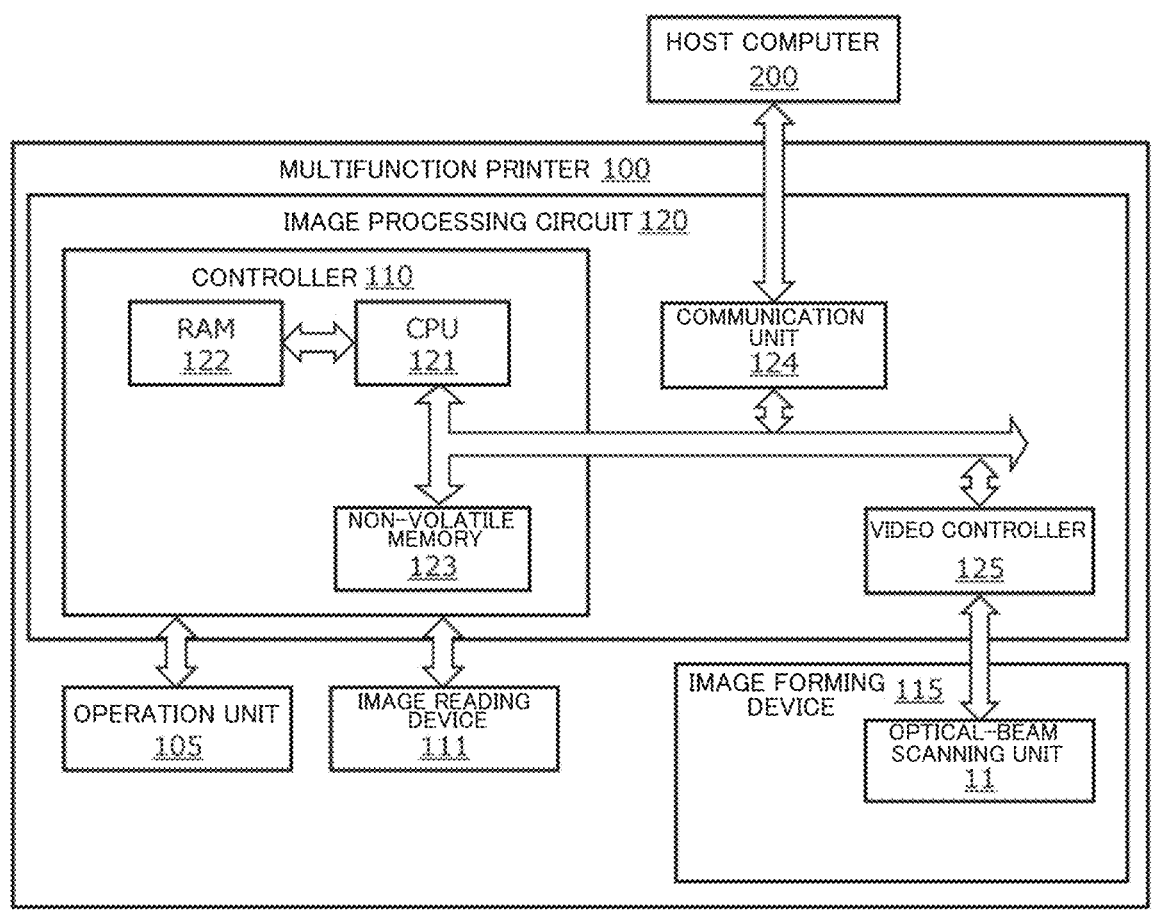
FIG. 3 is a block diagram illustrating the electrical configuration of the multifunction printer 100 shown in FIGS. 1 and 2.

FIG. 3 is a block diagram illustrating the electrical configuration of the multifunction printer 100 shown in FIGS. 1 and 2.

As illustrated in FIG. 3, the multifunction printer 100 includes the operation unit 105, the image reading device 111, the image forming device 115, and an image processing circuit 120.

The image processing circuit 120 includes the controller 110, a communication unit 124, and a video controller 125.

The controller 110 includes a CPU 21, which is a processor, a RAM 122 and a non-volatile memory 123. The non-volatile memory 123 is composed of a flash memory or an HDD. The non-volatile memory 123 stores a control program in advance that is executed by the CPU 121. The RAM 122 stores data that is used for CPU's processing, and data (such as images) relating to image formation. The CPU 121 executes the control program stored in the non-volatile memory 123. The CPU 121 also controls the operation of each unit of the multifunction printer 100 shown in FIG. 2 and controls data processing.

The operation unit 105 includes a liquid crystal display that serves as an input means (e.g., operation keys and a touch panel, both of which are hardware resources) and as a display means. The operation keys and touch panel receive user operations. The controller 110 recognizes the user operations received by the foregoing means and controls the liquid crystal display to display operation screens relating to the state of the multifunction printer 100 and to settings.

The communication unit 124 is an interface circuit for connecting the multifunction printer 100 to networks, such as a local area network (LAN).

The video controller 125 generates a scan signal and transmits the single to the optical-beam scanning unit 11. The scan signal controls scanning and optical exposure, which are performed by the optical-beam scanning unit, to form an electrostatic latent image corresponding to a target printing image onto the surface of the photoconductive drums 13.

The multifunction printer 100 receives a printing job from a host computer 200 connected via the communication unit 124. Alternatively, the multifunction printer 100 receives a printing job in response to a predetermined operation performed on the operation unit 105.

The controller 110 stores the received printing job in the non-volatile memory 123 temporarily. To execute the printing job, the controller 110 reads the printing job stored in the non-volatile memory 123, then analyzes a printer-command writing part contained in the printing job, and then controls the video controller 125 to perform conversion into raster data (generate a RIP image). This series of process steps uses the RAM 122 as well. Generating a RIP image requires a reasonable time.

For a printing job without a setting of an envelope type, that is, whether a longitudinal-feed or lateral-feed envelope, the controller 110 in this preferred embodiment performs control to generate in advance RIP images corresponding to the respective types. For instance, the controller 110 firstly performs control to generate a RIP image for a longitudinal-feed envelope and then stores the RIP image in the non-volatile memory 123. The controller 110 then reads the printing job again from the non-volatile memory 123, performs control to generate a RIP image for a lateral-feed envelope, and then stores the RIP image in the non-volatile memory 123. Here, the RIP image for the longitudinal-feed envelope and the RIP image for the lateral-feed envelope may be generated in any order.

The controller 110 controls the video controller 125 in the following manner upon type selection between longitudinal-feed and lateral-feed envelopes for use as a printing sheet, or upon placement of either type of an envelope into the feed tray. The controller 110 controls the video controller 125 to read, from the non-volatile memory 123, a RIP image conforming to the envelope type that has been selected or placed, and to transmit the RIP image to the image forming device 115. The image forming device 115 uses the optical-beam scanning unit 11 to form an electrostatic latent image corresponding to a raster image sent from the video controller 125 onto the surface of the photoconductive drums 13. The development unit 12 then develops the electrostatic latent image and then prints the image to the envelope. The controller 110 controls printing-related operations of the image forming device 115.

Figure 4A:
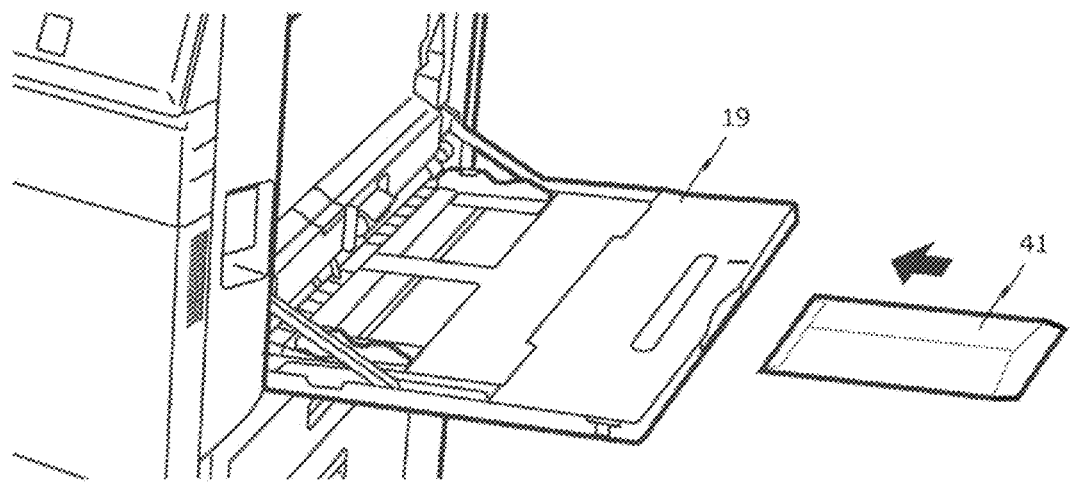
FIG. 4A illustrates the direction of placing a longitudinal-feed envelope into a manual-feed tray 19 in the preferred embodiment.

FIG. 4A illustrates the direction of placing a longitudinal-feed envelope into the manual-feed tray 19 in the preferred embodiment. FIG. 4A shown an arrow, which denotes the direction of paper feed into the manual-feed tray 19. A longitudinal-feed envelope 41 is placed in such a manner that its shorter side coincides with the end of the paper feed direction.

Figure 4B:
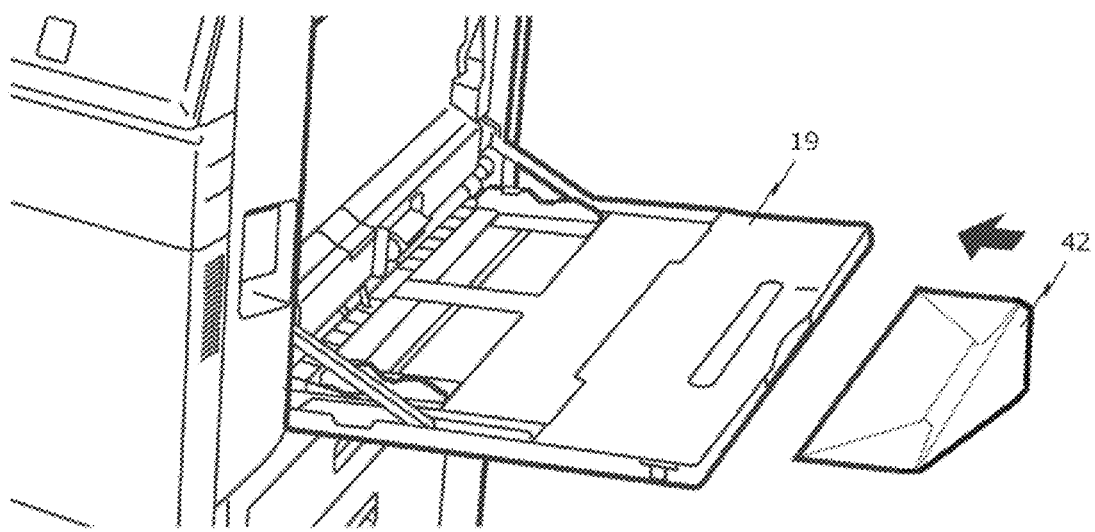
FIG. 4B illustrates the direction of placing a lateral-feed envelope into the manual-feed tray 19 in the preferred embodiment.

FIG. 4B illustrates the direction of placing a lateral-feed envelope into the manual-feed tray 19 in the preferred embodiment. FIG. 4B shows an arrow, which denotes the direction of paper feed into the manual-feed tray 19. A lateral-feed envelope 42 is placed in such a manner that its longer side coincides with the end of the paper feed direction.

Both the longitudinal-feed envelope 41 and lateral-feed envelope 42 are preferably placed in such a manner that their flaps are located at the rear ends, as illustrated in FIGS. 4A and 4B. Image formation apparatuses are designed to feed and transfer rectangular printing sheets. Envelopes with a trapezoidal flap (also called announcement envelopes) are somewhat close to a rectangle, whereas envelopes with a triangular flap (also called baronial envelops) particularly tend to be fed obliquely on feed and transfer paths if they are placed with their flaps located at the front ends. As a result, baronial envelops highly possibly have a wrinkle or involve a paper jam.

Once the type of an envelope is determined, the longitudinal and lateral direction, that is, whether to feed the envelope with its shorter sides located at the front and rear ends or to feed with its longer sides located at the front and rear ends is determined, as illustrated in FIGS. 4A and 4B. Printing needs to be performed using a raster image corresponding to the longitudinal and lateral direction.

If printing is performed using a raster image with its longitudinal and lateral direction is different from that of an envelope, which is a printing sheet, part of the raster image is not printed onto the envelope.

Figure 5A:
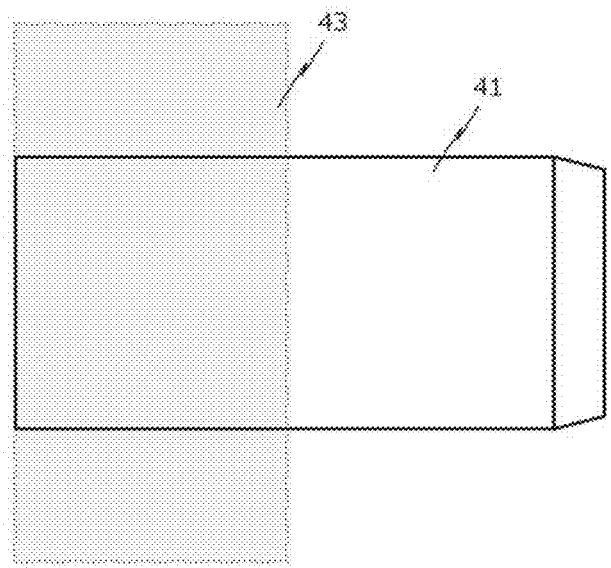
FIG. 5A illustrates a printing region for printing onto a longitudinal-feed envelope by the use of a lateral raster image in the preferred embodiment.
Figure 5B:
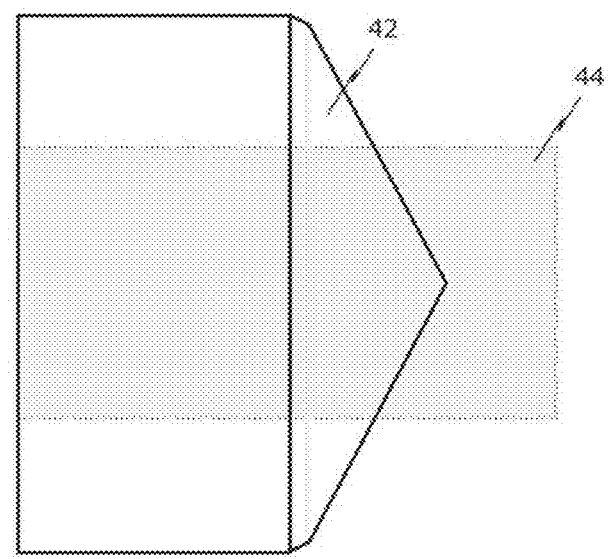
FIG. 5B illustrates a printing region for printing onto a lateral-feed envelope by the use of a longitudinal raster image in the preferred embodiment.

FIGS. 5A and 5B each illustrate an instance where the longitudinal and lateral direction of a raster image does not coincide with the longitudinal and lateral direction of an envelope, which is a printing sheet, in this preferred embodiment. FIG. 5A illustrates an instance where the longitudinal-feed envelope 41 undergoes printing using a lateral raster image. FIG. 5B illustrates an instance where the lateral-feed envelope 42 undergoes printing using a longitudinal raster image.

FIG. 5A shows a gray rectangular region, which is a printing region 43 corresponding to the lateral raster image. FIG. 5B shows a gray rectangular region, which is a printing region 44 corresponding to the longitudinal raster image. Neither of the printing regions coincides with the corresponding envelope and is thus printed partly onto the envelope.

Flowchart

With reference to a flowchart, the following describes an example printing job that is executed by the controller 110 in this preferred embodiment. Reference is made to an instance where the printing job does not designate an envelope type, that is, whether a longitudinal-feed envelope or a lateral-feed envelope.

Figure 6A:
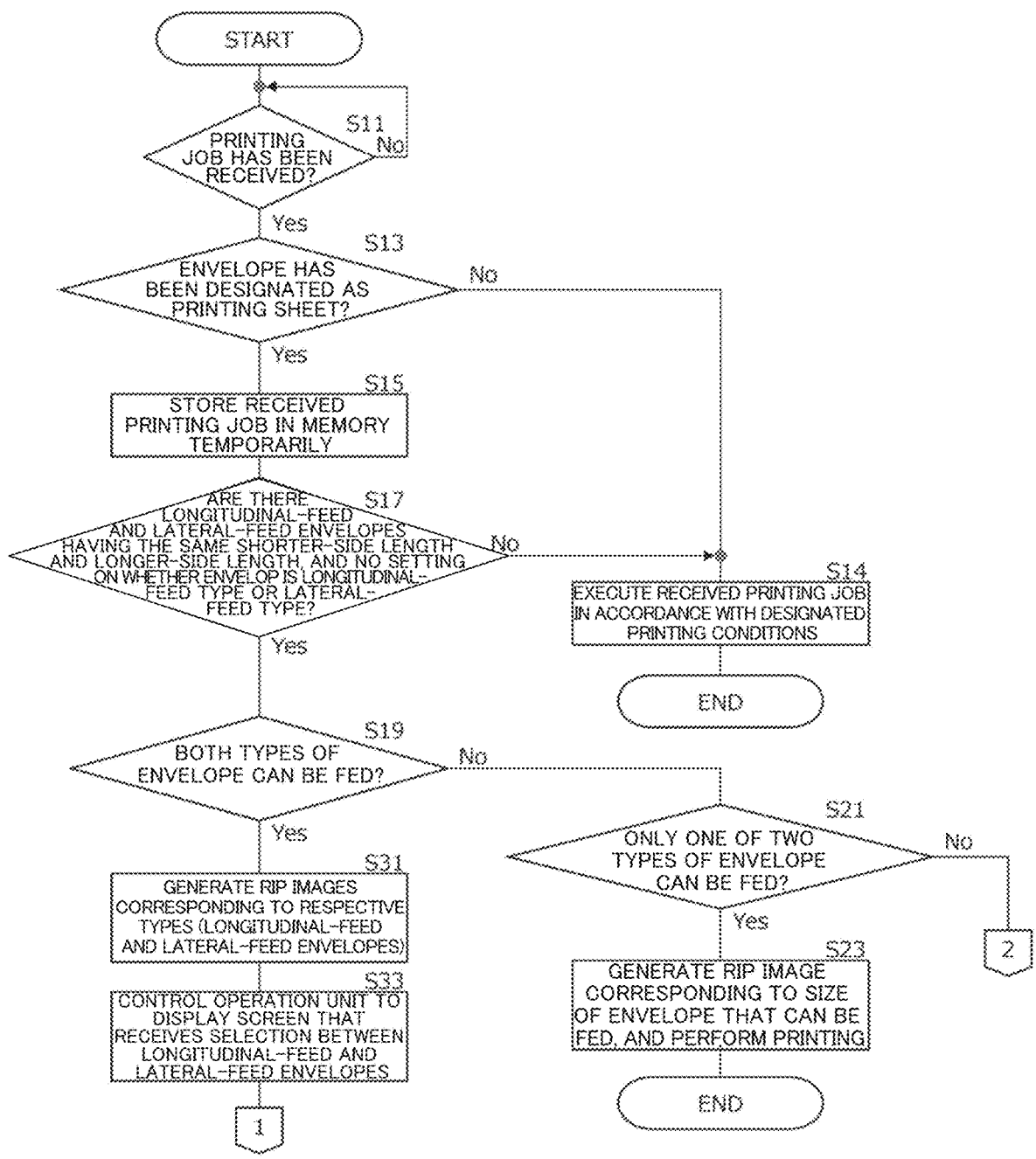
FIG. 6A is a first flowchart illustrating an example printing job that is executed by a controller in the preferred embodiment.
Figure 6B:
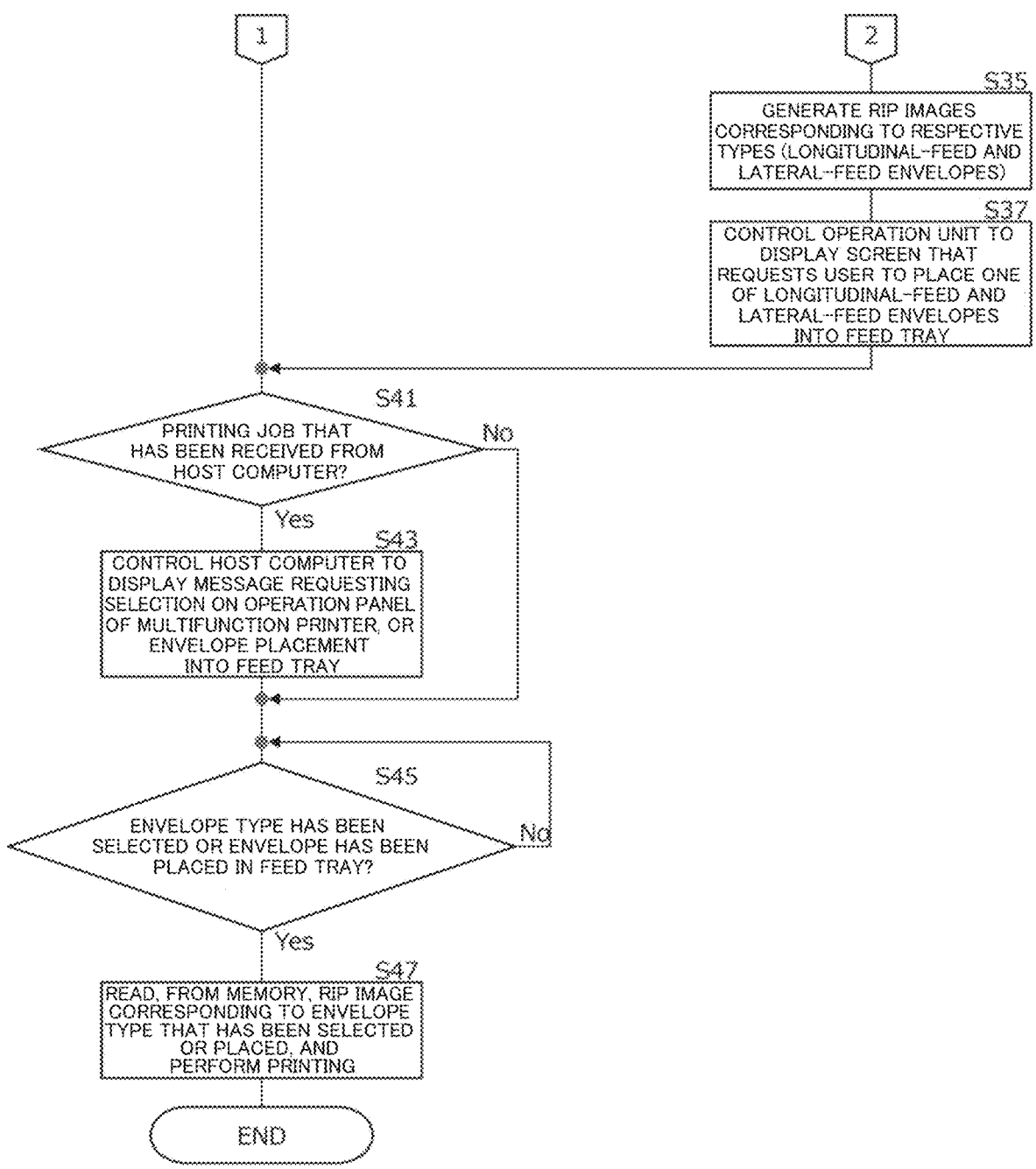
FIG. 6B is a second flowchart illustrating an example printing job that is executed by the controller in the preferred embodiment.

FIGS. 6A and 6B are flowcharts each illustrating an example printing job that is executed by the controller 110 in this preferred embodiment. In each flowchart, the printing job may be received from the external host computer 200 via the communication unit 124. Printing data may be stored in the host computer 200 or in a server, an FTP server, and other things on the Web accessible from the host computer 200.

The printing job may be received not only from the host computer 200, but also in response to a predetermined operation for instance, performed on the operation unit 105. For instance, the printing job of data stored in a USB memory connected to a USB connector (not shown in FIGS. 1 to 3) of the multifunction printer 100 may be received in response to a predetermined operation performed on the operation unit 105. The printing data relating to this printing job is received from the connected USB. Alternatively, the printing job of data stored in an external apparatus (e.g., an FTP server or an SMB server) capable of communication with the multifunction printer 100 via the communication unit 124 may be received in response to a predetermined operation performed on the operation unit 105. The printing data relating to this printing job is received from the FTP server or SMB server.

As illustrated in FIG. 6A, the process starts from Step S11, where the controller 110 awaits the reception of a printing job. Upon reception, the process proceeds to Step S13, where the controller 110 determines whether the printing conditions of the received printing job include that an envelope has been designated as a printing sheet. Here, that an envelope has been designated refers to an instance where the shorter-side length and longer-side length of a printing region coincide with the size of any envelope.

Upon determining that an envelope has not been designated as a printing sheet (if NO in Step S13), the process proceeds to Step S14, where the controller 110 executes printing in conformance with the printing conditions as a normal printing job and then ends the printing job. In a normal printing job, the size (type) of a printing sheet does not determine its longitudinal and lateral directions with respect to a paper feed direction; when a printing sheet having a size conforming to any feed tray (the feed tray drawer 18 or manual-feed tray 19) is placed, the controller 110 determines the longitudinal and lateral directions in accordance with the printing sheet and performs printing.

Upon determining that an envelope has been designated as a printing sheet (if YES in Step S13), the process proceeds to Step S15, where the controller 110 stores the received printing job in the non-volatile memory 123 temporarily. The process then proceeds to Step S17, where the controller 110 determines whether the printing job satisfies the following conditions: a size has been set that is applicable to both a longitudinal-feed envelope and a lateral-feed envelope having the same shorter-side length and longer-side length and having their flaps attached in mutually different directions; and whether the longitudinal-feed or lateral-feed envelope is unclear.

Upon determining that a size has been set that is applicable to only one of a longitudinal-feed envelope and a lateral-feed envelope (if NO in Step S17), the process proceeds to Step S14, where the controller 110 executes printing in accordance with the printing condition as a normal printing job and then ends the printing job. In addition, upon determining that a size has been set that is applicable to both of such longitudinal-feed and lateral-feed envelopes, but one of them has been set (if NO in Step S17), the process proceeds to Step S14, where the controller 110 executes printing in accordance with the printing condition as a normal printing job and then ends the printing job.

In contrast, upon determining that a size has been set that is applicable to both of such longitudinal-feed and lateral-feed envelopes and that whether the envelope is a longitudinal-feed type or lateral-feed type is unclear (if YES in Step S17), the process proceeds to Step S19, where the controller 110 next determines whether the feed tray is supplied with both longitudinal-feed and lateral-feed envelopes of the established size.

Upon determining that both longitudinal-feed and lateral-feed envelopes are placed (if YES in Step S19), the process proceeds to Step S31, where the controller 110 lets the user select between these envelopes and controls the video controller 125 to generate two different RIP images: one corresponding to the longitudinal-feed envelope, and the other corresponding to the lateral-feed envelope. The process then proceeds to Step S33, where the controller 110 controls the operation unit 105 to display an operation screen that receives a selection between the longitudinal-feed and lateral-feed envelopes, to request a user selection. The controller 110 then proceeds to Step S41 shown in FIG. 6B.

Upon determining that the feed tray is not supplied with both longitudinal-feed and lateral-feed envelopes (if NO in Step S19), the process proceeds to Step S21, where the controller 110 then determines whether only one of the two types of envelops is placed.

Upon determining that the feed tray is supplied with one of longitudinal-feed and widthwise feed envelopes (if YES in Step S21), the controller 110 determines that the envelope placed is a printing sheet intended by the user. Based on this determination, the controller 110 in Step S23 generates a RIP image corresponding to the envelope placed and then performs printing to the envelope. The controller 110 then ends the printing job.

Upon determining that the feed tray is supplied with neither a longitudinal-feed envelope nor a lateral-feed envelope (If NO in Step S21), the controller 110 lets the user select between these envelope types for printing. The process thus proceeds to Step S35 in FIG. 6B, where the controller 110 controls the video controller 125 to generate two different kinds of RIP images: one corresponding to a longitudinal-feed envelope and the other corresponding to a lateral-feed envelope. The process then proceeds to Step S37, where the controller 110 controls the operation unit 105 to display an operation screen requiring the user to place one of longitudinal-feed and lateral-feed envelopes into the feed tray, to thus request a user selection.

Figure 7A:
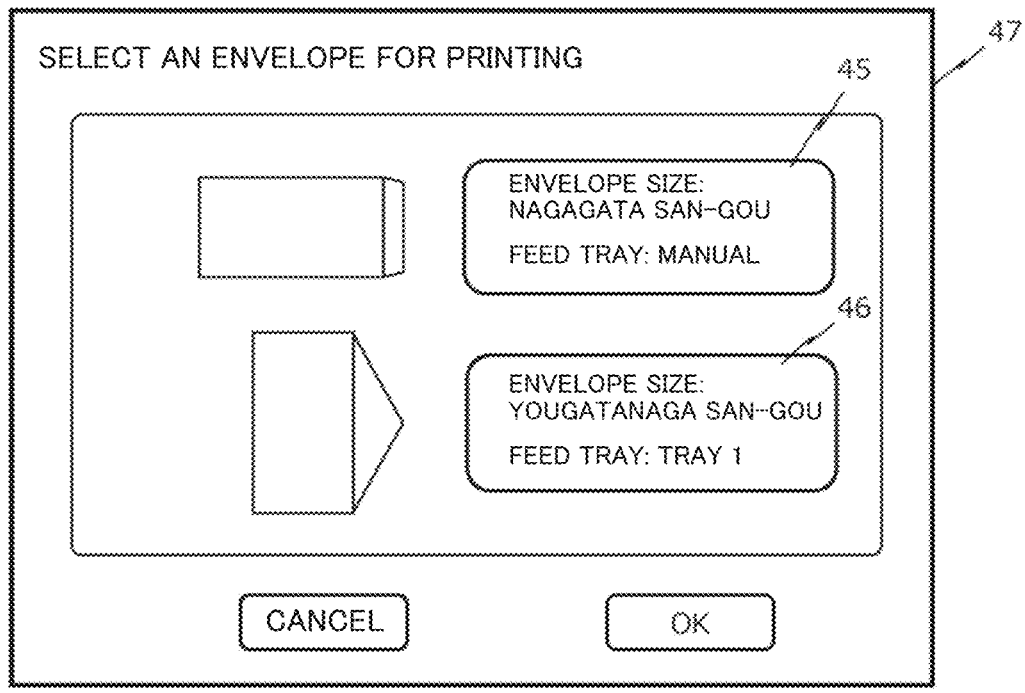
FIG. 7A illustrates an example operation screen for selection between a longitudinal-feed envelope and a lateral-feed envelope in the preferred embodiment.

FIG. 7A illustrates an example operation screen displayed by the operation unit 105 under the control of the controller 110 in Step S33. FIG. 7A shows an operation screen 47 requiring the user to select between a Nagagata san-gou, which is a longitudinal-feed envelope, and a Yougatanaga san-gou, which is a lateral-feed envelope. The controller 110 controls the operation unit 105 to display operation keys 45 and 46 on the right side in correspondence with the illustrations of the respective longitudinal-feed and lateral-feed envelopes. Each of the operation keys 45 and 46 displays the type of the envelope as well as which feed tray the envelope is placed in. The controller 110 recognizes which of the operation keys has been operated, to thus receive a user selection.

Figure 7B:
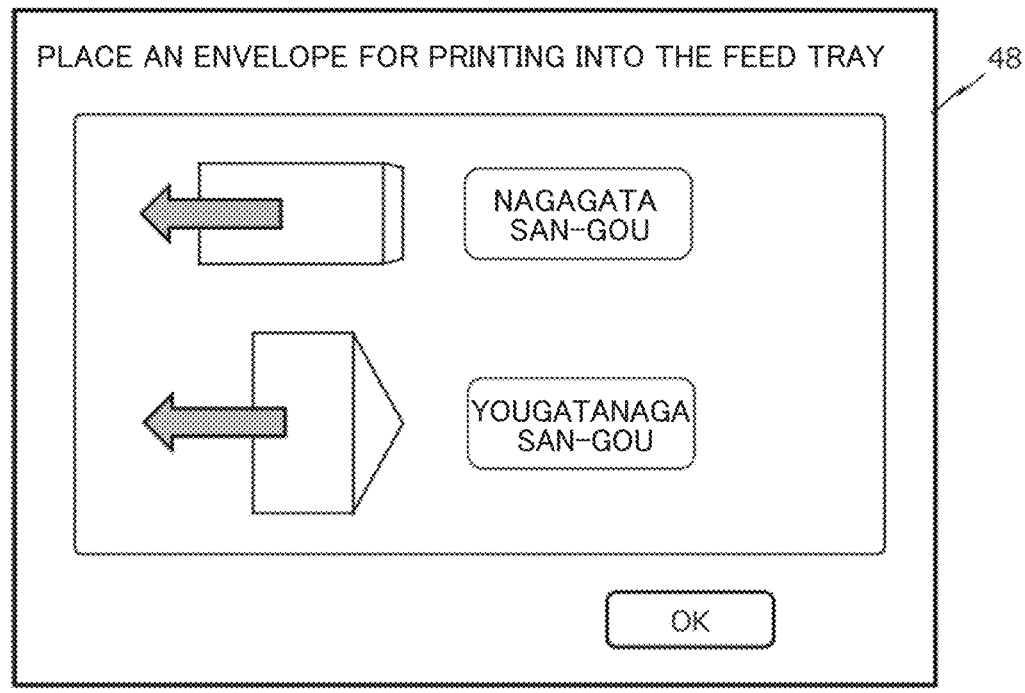
FIG. 7B illustrates an example operation screen requiring a user to place one of a longitudinal-feed envelope and a lateral-feed envelope into a feed tray in the preferred embodiment.

FIG. 7B illustrates an example operation screen displayed by the operation unit 105 under the control of the controller 110 in Step S37. FIG. 7B shows an operation screen 48 requiring the user to place one of a Nagagata san-gou, which is a longitudinal-feed envelope, and a Yougatanaga san-gou, which is a lateral-feed envelope, into the feed tray. FIG. 7B shows illustrations of the respective longitudinal-feed and lateral-feed envelopes together with the direction of paper feed and the direction of envelope placement. Displayed on the right side of each envelope is the type of the envelope.

Although each feed tray is capable of detecting the size of a paper sheet that has been placed, some feed trays do not have such a capability. For feed trays without such a capability (a second preferred embodiment), the controller 110 may control the operation unit 105 to display operation keys rather than to display the types of the envelopes shown in FIG. 7B, and may then recognize which of the operation keys has been operated, to thus determine the type of the envelope placed.

Now, referring back to the flowchart, the controller 110 in Step S33 controls the operation unit 105 to display the operation screen 47, or the controller 110 in Step S37 controls the operation unit 105 to display the operation screen 48. The process then proceeds to Step S41, where the controller 110 determines whether the received printing job is from the host computer 200 or from the operation unit 105.

Step S41 and Step S43, described below, are included in a preferred embodiment (a third preferred embodiment) rather than in the basic preferred embodiment.

If the printing job has been received from the external host computer 200 (if YES in Step S41), the process proceeds to Step S43, where the controller 110 sends, to the host computer 200, a notification requesting message display. The message tells the user to select an envelope by operating the operation screen 47, which is displayed on the operation panel of the multifunction printer 100. Alternatively, the message tells the user to place an envelope into the feed tray drawer 18 or manual-feed tray 19 of the multifunction printer 100.

If the printing job has been received from the operation unit 105 (if NO in Step S41), this means that the user is near the multifunction printer 100, and the controller 110 hence does not have to control the host computer 200 to display such a message. The controller 110 accordingly proceeds to Step S45 described below.

Figure 8:
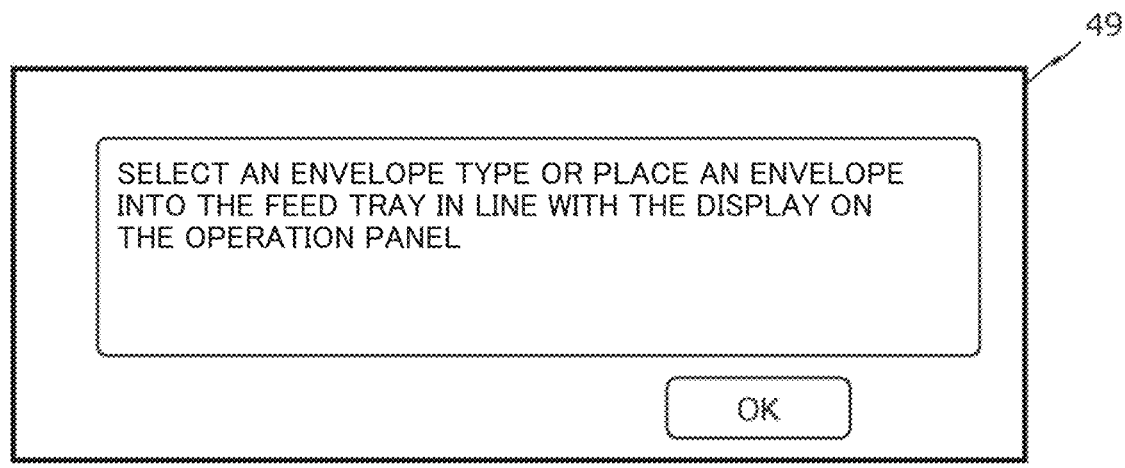
FIG. 8 illustrates an example message displayed by an external host computer upon request from the multifunction printer in the preferred embodiment.

FIG. 8 illustrates an example message displayed by the host computer 200 in response to the foregoing request. FIG. 8 shows a message 49, which appears on a display (not shown in FIG. 3) of the host computer 200 for instance. The message 49 notifies that the user who operates the host computer 200 needs to operate the multifunction printer 100.

The foregoing has described process steps relating to the third preferred embodiment.

Back to the basic preferred embodiment, the controller 110 in Step S45 awaits a selection between the foregoing types on the operation screen 47, or envelope placement into the feed tray. An envelope type selection or envelope placement into the feed tray can tell an envelope type for use in printing. The process then proceeds to Step S47, where the controller 110 reads, from the non-volatile memory 123, a RIP image corresponding to the envelope for use in printing. The controller 110 then ends the printing job.

The foregoing has described process steps relating to the execution of the printing job.

As described above, (i) an image formation apparatus according to one aspect of this invention includes a communication unit that receives, as a printing job, a printing setting and printing data corresponding to the printing setting. The printing setting includes a size corresponding to one of a longitudinal-feed envelope and a lateral-feed envelope, but does not designate which of the longitudinal-feed and lateral-feed envelopes undergoes printing. The longitudinal-feed envelope and the lateral-feed envelope have an equal shorter-side length and an equal longer-side length, and have respective flaps attached in mutually different directions. The image formation apparatus also include a controller that controls the execution of the printing job received. The image formation apparatus also includes a raster image generator that, upon being instructed by the controller, generates a raster image corresponding to the longitudinal-feed envelope and a raster image corresponding to the lateral-feed envelope in accordance with the printing data. The image formation apparatus also includes an operation unit that, upon being instructed by the controller, displays a screen that receives a selection between the longitudinal-feed and lateral-feed envelopes, to receive the selection made by a user. The image formation apparatus also includes an image forming device that, upon being instructed by the controller, performs printing with the raster image corresponding to the longitudinal-feed or lateral-feed envelope selected.

The aspect of this invention defines the length of the shorter sides as the length of the shorter sides of a rectangle with its envelope flap folded and defines the length of the longer sides as the length of the longer sides of the rectangle. Envelopes are normally fed with their flaps being open and located at the rear ends. The Description distinguishes an envelope with a flap on its shorter side, which is called a longitudinal-feed envelope, from an envelope with a flap on its longer side, which is called a lateral-feed envelope.

Moreover, a raster image expresses an image as a plane consisting of many parallel scan lines. For instance, a scan signal generated by the video controller in the foregoing preferred embodiments corresponds to a scan line. The video controller in the foregoing preferred embodiments corresponds to the raster image generator of the aspect of this invention. The optical-beam scanning unit in the foregoing preferred embodiments performs scanning and exposure using light corresponding to a scan signal generated by the video controller, to thus form an electrostatic latent image onto the surface of the photoconductive drum.

The controller controls the operation of the image formation apparatus relating to the execution of a printing job. Specifically, the controller is, but not limited to, a circuit board that mainly includes a processor (e.g., a CPU or an MPU) and a memory, as described in the foregoing preferred embodiments. The processor executes a control program stored in advance in the memory, thus organically combining hardware with software to implement the functions of the controller.

A further preferred aspect of this invention will be described.

(ii) The image forming device includes a feed tray into which a printing sheet is supplied. When the feed tray is supplied with neither of the longitudinal-feed and lateral-feed envelopes, the controller may control the operation unit to display a screen requiring the user to place one of the longitudinal-feed and lateral-feed envelopes, and controls the image forming device to perform printing on the longitudinal-feed or lateral-feed envelope placed, using the raster image corresponding to the longitudinal-feed or lateral-feed envelope.

In this configuration, the controller generates raster images corresponding to respective longitudinal-feed and lateral-feed envelopes when neither of the envelopes is placed in the feed tray in response to a printing job without the designation of an envelope type for use in printing, and the controller tells the user to place one of the envelopes into the feed tray and performs printing on the placed envelope using the raster image corresponding to the placed envelope. This offers proper printing.

(iii) The image forming device includes a plurality of feed trays each of which feed a supplied printing sheet. When one of the feed trays is supplied with the longitudinal-feed envelope, and another one of the feed trays is supplied with the lateral-feed envelope, the controller may control the operation unit to display the screen that receives the selection between the longitudinal-feed and lateral-feed envelopes, and may control the image forming device to feed the longitudinal-feed or lateral-feed envelope corresponding to the selection received, to perform printing.

In this configuration, the controller generates raster images corresponding to respective longitudinal-feed and lateral-feed envelopes when both of the envelopes are placed in the respective feed trays in response to a printing job without the designation of an envelope type for use in printing, and the controller receives a user selection of which of the envelops is used for printing. This offers proper printing.

(iv) When the printing job is instructed by an external apparatus capable of communication via the communication unit, the controller may send, to the external apparatus, a notification indicating that the feed tray or the operation unit needs to be operated.

In response to a printing job instructed by the external apparatus, this configuration allows the user who operates the external apparatus to know that the operation unit or feed tray of the image formation apparatus needs to be operated.

(v) Another aspect of this invention provides a method of image formation that is performed by a controller of an image formation apparatus. The method includes receiving, as a printing job, a printing setting and printing data corresponding to the printing setting. The printing setting includes a size corresponding to one of a longitudinal-feed envelope and a lateral-feed envelope, but does not designate which of the longitudinal-feed and lateral-feed envelopes undergoes printing. The longitudinal-feed envelope and the lateral-feed envelope have an equal shorter-side length and an equal longer-side length, and have respective flaps attached in mutually different directions. The method also includes generating a raster image corresponding to the longitudinal-feed envelope and a raster image corresponding to the lateral-feed envelope in accordance with the printing data. The generation step is performed by a raster image generator. The method also includes displaying a screen that receives a selection between the longitudinal-feed and lateral-feed envelopes, to receive the selection made by a user. The display step is performed by an operation unit. The method also includes printing by using the raster image corresponding to the longitudinal-feed or lateral-feed envelope selected. The printing step is performed by an image forming device.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image formation apparatus comprising:
   an interface circuit configured to receive, as a printing job, a printing setting and printing data corresponding to the printing setting, the printing setting including a size corresponding to at least one of a longitudinal-feed envelope or a lateral-feed envelope, but not designating which of the longitudinal-feed envelope and the lateral-feed envelope undergoes printing, the longitudinal-feed envelope and the lateral-feed envelope having an equal shorter-side length and an equal longer-side length, and having respective flaps attached in mutually different directions;
   a controller configured to control execution of the printing job received;
   a video controller configured to, upon being instructed by the controller, generate at least one raster image comprising at least one of a first raster image corresponding to the longitudinal-feed envelope and a second raster image corresponding to the lateral-feed envelope in accordance with the printing data;
   a display configured to, upon being instructed by the controller, display a screen that receives, from a user, a selection between the longitudinal-feed envelope and the lateral-feed envelope; and
   an image forming device configured to, upon being instructed by the controller, perform printing with one of the at least one raster image, wherein
   the controller controls the video controller to generate the first raster image and the second raster image when:
      the size of the printing setting is applicable to both the longitudinal-feed envelope and the lateral-feed envelope, and
      the printing setting does not designate which of the longitudinal-feed envelope and the lateral-feed envelope undergoes printing.

2. The image formation apparatus according to claim 1, wherein
   the image forming device includes a feed tray into which a printing sheet is supplied, and
   when the feed tray is supplied with neither the longitudinal-feed envelope nor the lateral-feed envelope, the controller controls the display to display a screen requiring the user to place one of the longitudinal-feed envelope or the lateral-feed envelope into the feed tray, and controls the image forming device to perform printing on the longitudinal-feed envelope or the lateral-feed envelope placed into the feed tray, using the raster image corresponding to the longitudinal-feed envelope or the lateral-feed envelope.

3. The image formation apparatus according to claim 2, wherein
   when the printing job is instructed by an external apparatus capable of communication via the interface circuit, the controller sends, to the external apparatus, a notification indicating that the feed tray or the display needs to be operated.

4. The image formation apparatus according to claim 1, wherein
   the image forming device includes a plurality of feed trays, each configured to feed a supplied printing sheet, and
   when one of the plurality of feed trays is supplied with the longitudinal-feed envelope, and another one of the plurality of feed trays is supplied with the lateral-feed envelope, the controller controls the display to display the screen that receives the selection between the longitudinal-feed envelope and the lateral-feed envelope, and controls the image forming device to feed the longitudinal-feed envelope or the lateral-feed envelope corresponding to the selection received, to perform printing.

5. A method of image formation that is performed by a controller of an image formation apparatus, the method comprising:
   receiving, as a printing job, a printing setting and printing data corresponding to the printing setting, the printing setting including a size corresponding to at least one of a longitudinal-feed envelope or a lateral-feed envelope, but not designating which of the longitudinal-feed envelope and the lateral-feed envelope undergoes printing, the longitudinal-feed envelope and the lateral-feed envelope having an equal shorter-side length and an equal longer-side length, and having respective flaps attached in mutually different directions;
   generating, by a video controller, at least one raster image comprising at least one of a first raster image corresponding to the longitudinal-feed envelope and a second raster image corresponding to the lateral-feed envelope in accordance with the printing data;
   displaying, by a display, a screen that receives, from a user, a selection between the longitudinal-feed envelope and the lateral-feed envelope; and
   printing, by an image forming device, using one of the at least one raster image, wherein
   the first raster image and the second raster image are generated when:
      the size of the printing setting is applicable to both the longitudinal-feed envelope and the lateral-feed envelope, and
      the printing setting does not designate which of the longitudinal-feed envelope and the lateral-feed envelope undergoes printing.

* * * * *